United States Patent [19]

Heider et al.

[11] Patent Number: 5,087,676
[45] Date of Patent: Feb. 11, 1992

[54] PREPARATION OF POLYMERS FROM OLEFINICALLY UNSATURATED MONOMERS

[75] Inventors: Lothar Heider; Gerhard Storck, both of Ludwigshafen; Hans-Joachim Weintz, Weisenheim, all of Fed. Rep. of Germany

[73] Assignee: BASF Aktiengesellschaft, Ludwigshafen, Fed. Rep. of Germany

[21] Appl. No.: 413,589

[22] Filed: Sep. 28, 1989

[51] Int. Cl.$^5$ .............................. C08F 4/06; C08F 4/40; C08F 4/42
[52] U.S. Cl. .................................................. 526/93
[58] Field of Search ........................................ 526/93

[56] References Cited

FOREIGN PATENT DOCUMENTS 607735  9/1948  United Kingdom .

Primary Examiner—Paul R. Michl
Assistant Examiner—J. McDonald, Jr.
Attorney, Agent, or Firm—Oblon, Spivak, McClelland, Maier & Neustadt

[57] ABSTRACT

Polymers are prepared from olefinically unsaturated monomers in an aqueous medium using a free radical initiator system which is soluble in this medium and consists of an oxidizing agent, a reducing agent and an iron salt, by a process in which a corresponding redox initiator system which contains a vanadium salt is used in addition to this iron-containing redox initiator system, and the content of olefinically unsaturated residual monomers in aqueous polymer mixtures or solutions is reduced by this process.

10 Claims, No Drawings

PREPARATION OF POLYMERS FROM OLEFINICALLY UNSATURATED MONOMERS

The present invention relates to a novel process for the preparation of polymers from olefinically unsaturated monomers in an aqueous medium using a free radical initiator system which is soluble in this medium and consists of an oxidizing agent, a reducing agent and an iron salt.

Polymerizations of olefinically unsaturated monomers in an aqueous medium using free radical initiators have been described in many publications. German Patent DE-A 848 258 discloses that polymerization can be facilitated by adding reducing agents when peroxide initiators are used, these initiators generally forming free radicals through thermal decomposition. The use of such initiator systems having greater efficiency has the advantage that the polymerization rate can be increased at a given reaction temperature or the same polymerization rate can be obtained at lower temperatures. The latter procedure generally gives purer polymers, which is generally desirable for application-related reasons.

The above patent furthermore discloses that, in polymerizations of olefinically unsaturated monomers with the aid of such redox initiator systems consisting of an oxidizing agent and a reducing agent, the initiator system can be activated by adding small amounts of a metal compound which is soluble in the reaction medium and whose metallic component can occur in a plurality of valent states, and the polymerization can thus be additionally facilitated.

For polymerizations of olefinically unsaturated monomers in aqueous polymerization media, GB-A 607 735 discloses, for a pH of from 1 to 13, various redox initiator systems which contain a peroxide and a reducing agent and contain an iron or vanadium salt as a metal compound which additionally facilitates the polymerization.

However, as in any industrial polymerization, the constituents of these initiator systems remain in free form, unchanged or chemically changed, or chemically bonded in the polymer or its solution or dispersion. Although the amounts involved are generally only small, the presence of these substances is generally undesirable, particularly in the case of the metal salts, because either the properties of the polymers are adversely affected as a result or the polymers do not meet the purity requirements.

It is an object of the present invention to provide a novel process for the preparation of polymers from olefinically unsaturated monomers in an aqueous medium using a metal-activated free radical redox initiator system which is soluble in this medium and is even more efficient than the redox initiator systems activated by an iron or vanadium salt, so that, even when small amounts of the initiator system are used, the desired effect can be achieved.

We have found that this object is achieved by a process for the preparation of polymers from olefinically unsaturated monomers in an aqueous medium using a free radical redox initiator system which is soluble in this medium and consists of an oxidizing agent and a reducing agent and an iron salt, wherein a corresponding redox initiator system which contains a vanadium salt is used in addition to this iron-containing redox initiator system.

If a redox initiator system containing an iron salt or a vanadium salt is used alone, the action of the metal compounds is probably due to the fact that the metallic component is converted repeatedly and regularly into a higher valent state (Fe(II)→Fe(III), V(II to IV) →V(V)) by the oxidizing agent and into a lower valent state by the reducing agent, with formation of free radicals, the oxidation generally being the slowest step in the iron-containing initiator system and the reduction generally being the slowest step in the vanadium-containing initiator system.

When a redox initiator system containing an iron salt and a redox initiator system containing a vanadium salt are used together, the rate-determining steps of the individual systems are presumably bypassed by a rapid redox reaction between Fe(II) and V(V). In any case, the result is a total redox initiator system which has greater efficiency and whose number of free radicals formed per unit time at a given temperature is greater than the sum of the numbers of free radicals formed per unit time by the two individual redox initiator systems when they are used separately, under otherwise identical conditions.

Redox initiator systems containing an iron salt or a vanadium salt which are particularly suitable for the novel process are those which already have good efficiency when used alone under the particular polymerization conditions. They are described for many polymerizations in the technical literature (for example GB-A 607 735 or Houben-Weyl, Methoden der organischen Chemie, Vol. XIV/1, E. Müller (Editor), Georg-Thieme-Verlag Stuttgart, 4th edition (1961), page 281 et seq.). For the free radical homopolymerization of vinyl acetate in aqueous solution at a pH of from 1 to 5, for example, a total redox initiator system consisting of ammonium per-sulfate, ascorbic acid and iron-(II) sulfate on the one hand and hydrogen peroxide, the sodium salt of hydroxy-methanesulfonic acid and vanyl-(IV) sulfate pentahydrate ($VOSO_4.5H_2O$) on the other hand is particularly suitable.

However, the only essential preconditions for high efficiency of the total redox initiator systems used for the novel polymerization process is that these systems contain a reducing agent which converts Fe(III) into Fe(II) at a fast rate under the polymerization conditions, and an oxidizing agent which converts the lower valence states of vanadium into V(V) at a fast rate under the polymerization conditions, and one or both of these two steps takes place with free radical formation. Whether these preconditions are fulfilled can be determined without difficulties by attempting on the one hand to reduce Fe(III) to Fe(II) and to oxidize V(II to IV) to V(V) under the polymerization conditions and on the other hand to initiate the polymerization merely via the corresponding step.

While the reduction of Fe(III) cannot generally be carried out with free radical formation, the following oxidizing agents have proven particularly effective for oxidizing V(II to IV) with free radical formation: peroxy compounds, such as acyl peroxides, e.g. benzoyl peroxide, and hydroperoxides, such as hydrogen peroxide and particularly preferably tert-butyl hydroperoxide and cumene hydroperoxide. Oxygen donors without a peroxide structure, such as alkali metal chlorates and perchlorates, transition metal compounds, such as potassium permanganate, manganese dioxide and lead dioxide, and also lead tetraacetate and iodobenzene, are also suitable for oxidizing the lower valent states of vanadium with free radical formation.

Particularly effective agents for reducing Fe(III) are sulfinic acids, e.g. alkylsulfinic acids, such as isopropylsulfinic acid, arylsulfinic acid, such as phenylsulfinic acid, or hydroxyalkylsulfinic acids, such as hydroxymethanesulfinic acid, and the alkali metal salts of these acids, reducing sugars, such as lactose and fructose, and derivatives of these, such as ascorbic acid.

We have also found that the stated oxidizing agents are in general also effective as oxidizing agents for Fe(II) and the stated reducing agents are frequently also effective as reducing agents for V(V), the reduction of V(V) generally taking place with free radical formation, in contrast to the reduction of Fe(III).

The use of total redox intiator systems which contain, in addition to an iron salt and a vanadium salt, only one of the stated oxidizing agents and one of the stated reducing agents is in general particularly advantageous.

Peroxydisulfuric acid and its alkali metal or ammonium salts may additionally be used as an oxidizing agent for Fe(II), while alkanols, such as ethanol, ketones, such as acetone or cyclohexanone, aldehydes, such as acetaldehyde, carboxylic acids, such as acetic acid, hydroxycarboxylic acids, such as hydroxyacetic acid and citric acid, ketocarboxylic acids, such as pyruvic acid, and preferably polyhydroxycarboxylic acids, such as tartaric acid, aliphatic dialdehydes, such as glyoxal, amines, such as diethylamine or aniline, and mercaptans, such as tert-dodecylmercaptan, are also suitable as reducing agents for V(V). In general, the stated oxidizing and reducing agents are effective both in an acidic medium and in a neutral or alkaline medium.

The vanadium and iron salts which may be used are all those which are sufficiently soluble in the aqueous reaction medium. Iron(II) sulfate, iron(II) chloride, iron(II) nitrate, iron(II) acetate and the corresponding iron(III) salts, ammonium or alkali metal vanadates (V(V)), vanadium(III) chloride, vanadyl(V) trichloride and in particular vanadyl(IV) sulfate pentahydrate ($VOSO_4 \cdot 5H_2O$) are advantageously used. In general, it must be ensured that the metallic components are not precipitated by assistants, such as bases, acids, buffer substances, salts, etc. which are added in the polymerization. In such cases, complexing agents which keep the metals in solution under the reaction conditions are added. Examples of suitable complexing agents are the alkali metal salts of tartaric acid, citric acid, pyrophosphoric acid and ethylenediaminetetraacetic acid. Complexing agents which are also suitable as reducing agents, for example tartaric acid, are advantageously used.

The ratio of oxidizing agents to reducing agents for the two individual redox intiator systems which form the total redox initiator system, and of which one contains an iron salt soluble in the reaction medium and the other contains a vanadium salt soluble in the reaction medium, can be varied within wide limits. Both the oxidizing agent and the reducing agent can be used in excess in each case. They are preferably used in equivalent amounts. On the other hand, it is advantageous if the amount of metal compound added is no greater than that required to achieve the optimum effect. This is generally the case with an amount of from 0.01 to 1% by weight of the oxidizing agent or reducing agent. The atomic ratio of iron to vanadium can likewise be varied within wide limits. However, a detectable synergistic effect is generally observed only with an atomic ratio of Fe:V of from 1000:1 to 1:1000. Usually, both metals are used in a ratio of from 100:1 to 1:100, preferably from 10:1 to 1:10, a ratio of 1:1 being particularly preferred.

The preferably used amounts of oxidizing or reducing agents are in general from 0.1 to 1% by weight of the amount of monomers to be polymerized. The various constituents of the total redox initiator system are advantageously added separately from one another and the addition may be made at the beginning of the polymerization or during the latter, as required. The constituents are advantageously added in the form of aqueous solutions.

The synergistic effect of a combination of a redox initiator system containing an iron salt and a redox initiator system containing a vanadium salt occurs both in an acidic medium and in a neutral or alkaline medium. The pH is preferably from 1 to 12, particularly preferably from 2 to 7. Frequently, the pH of the polymerization medium is determined by the composition of the monomer mixture or by the reducing agents added. However, it can also be shifted into the desired range by adding small amounts of organic or inorganic acids, such as acetic acid, ascorbic acid, hydrochloric acid, sulfuric acid or phosphoric acid, and bases, such as ammonia, organic amines or alkali metal hydroxides, if necessary supported by buffer systems, In addition to water, the polymerization medium may contain not more than 95% by weight of water-miscible liquids which may simultaneously be reducing agents, for example lower alcohols, such as methanol or ethanol.

The polymerization temperature has a minor effect. It is essentially restricted by the freezing point and boiling point of the reaction medium and is in general from 0° to 100° C.

As is usual in free radical polymerization, the process is carried out in the absence of atmospheric oxygen. The following are particularly suitable unsaturated compounds whose free radical polymerization can be initiated by the claimed process: $C_2-C_{10}$-alkenes, preferably ethylene and isobutene, conjugated dienes of 4 to 9 carbon atoms, preferably butadiene, $\alpha,\beta$-monoethylenically unsaturated monocarboxylic acids of 3 to 5 carbon atoms and their esters of a $C_1-C_{12}$-alkanol, preferably acrylic acid and methacrylic acid as well as methyl, ethyl, n-butyl, tert-butyl and ethylhexyl acrylate and methacrylate, monoethylenically unsaturated dicarboxylic acids of 4 or 5 carbon atoms and their half esters and full esters with $C_1-C_{12}$-alkanols, preferably fumaric acid, maleic acid and itaconic acid, vinyl esters of a $C_1-C_{12}$-alkanoic acid, preferably vinyl acetate and vinyl propionate, vinylaromatics, such as styrene or divinylbenzene, and vinyl chloride, vinylidene chloride and acrylonitrile. The novel procedure is also applicable to copolymerizations and in the presence of regulators, for example mercaptans, such as dodecylmercaptan.

The novel procedure is particularly advantageous for carrying out free radical emulsion polymerizations in an aqueous medium in a generally known manner. The choice of emulsifiers depends on whether the process is carried out in an alkaline, neutral or acidic medium. The sodium salts of alkylsulfates, such as sodium n-dodecylsulfate or sodium n-dodecylbenzenesulfonate, are particular examples for the alkaline medium, and ethoxylated alkylphenols (degree of ethoxylation: 3–30, $C_8-C_{10}$-alkyl radical) and/or ethoxylated fatty alcohols (degree of ethoxylation 5–50, $C_8-C_{23}$-alkyl radical) and ethoxylated alkylphenols which are additionally sulfated (degree of ethoxylation 5-50, $C_8$-$C_{10}$-alkyl radical) are particular examples for the neutral and acidic medium.

Over and above its use for carrying out a principal polymerization, the novel polymerization process can advantageously be used as a post-polymerization process to reduce the residual content of olefinically unsaturated monomers in acidic or alkaline aqueous polymer mixtures or solutions. Undesirable residual amounts of monomers frequently occur since it is generally uneconomical to attempt to achieve complete conversion in the principal polymerization while maintaining the actual polymerization conditions.

By adding small amounts of the novel total redox initiator system, in general from 0.1 to 10% by weight, based on the total amount of the olefinically unsaturated residual monomers, these residual monomers can be effectively caused to undergo post-polymerization even at low temperatures, for example in the storage tank, and can thus be reduced, without the cost-efficiency of the principal polymerization process or the product quality being substantially adversely affected. The latter is particularly the case when appropriately functionalized residual monomers, such as acrylic acid and maleic acid, or any regulators still present after the principal polymerization, such as tert-dodecylmercaptan, can perform the function of the reducing agent. The novel process is particularly advantageously used for post-polymerization in aqueous plastic dispersions whose pH is preferably from 1 to 12.

EXAMPLES 1 TO 3 AND COMPARATIVE EXAMPLES V1 TO V6

The rate of the free radical emulsion polymerization of vinyl acetate as a function of the initiator system to be used.

200 g of vinyl acetate were emulsified in a solution of 4 g of the Na salt of n-dodecylsulfonic acid and 0.04 g of the Na salt of ethylenediaminetetraacetic acid in 750 g of water, after which the emulsion was heated to the polymerization temperature of 40° C. and, after the addition of the initiator systems listed in Table 1, polymerization was carried out under a protective gas ($N_2$).

The reducing agent, the salts and the oxidizing agent were added separately from one another, in this order, dissolved in 10 g of water in each case. After the end of the addition of the reducing agent, the pH of the polymerization medium was brought to 3 in each case by the addition of small amounts of sulfuric acid. The conversions achieved after 0.5 and 7 h are likewise shown in Table 1.

TABLE 1

| Composition [g] | 1 | V1 | V2 | 2 | V3 | V4 | 3 | V5 | V6 |
|---|---|---|---|---|---|---|---|---|---|
| Tert-butyl hydroperoxide | 0.2 | 0.2 | 0.2 | 0.2 | 0.2 | 0.2 | 0.2 | 0.2 | 0.2 |
| Na salt of hydroxy-methanesulfinic acid | 0.2 | 0.2 | 0.2 | — | — | — | — | — | — |
| Glyoxal | — | — | — | 0.2 | 0.2 | 0.2 | — | — | — |
| Ascorbic acid | — | — | — | — | — | — | 0.2 | 0.2 | 0.2 |
| $FeSO_4$ | 0.001 | 0.002 | — | 0.001 | 0.002 | — | 0.001 | 0.002 | — |
| $VOSO_4.5H_2O$ | 0.001 | — | 0.002 | 0.001 | — | 0.002 | 0.001 | — | 0.002 |
| Conversion [%] | | | | | | | | | |
| 0.5 h | 95 | 25 | 0.5 | 56 | 0.1 | 36 | >99 | 88 | 45 |
| A 1 h | >99 | 30 | 0.75 | 87 | 0.2 | 74 | >99.5 | 97 | 78 |

EXAMPLE 4

Reduction of the content of residual monomers

A monomer mixture consisting of
30 g of n-butyl acrylate,
55 g of ethylhexyl acrylate,
13 g of methylmethacrylate and
2 g of maleic acid
was emulsified in a solution of 0.5 g of the Na salt of n-dodecylsulfonic acid in 100 g of water, 0.6 g of sodium peroxydisulfate and 0.1 g of tert-dodecylmercaptan were added separately and polymerization was then carried out at 80° C. for 3 hours to a conversion of 99.5%. The dispersion, which had a pH of 4, was then cooled to 25° C. 0.0005 g of $VOSO_4.5H_2O$, 0.0005 g of $FeSO_4$, 0.05 g of the Na salt of hydroxymethanesulfinic acid, 0.05 g of tert-butyl hydroperoxide and 0.001 g of the Na salt of ethyl-enediaminetetraacetic acid, dissolved in each case in 1 g of water, were then added separately from one another.

The following residual monomer contents, based on the total weight of the dispersion, were determined four hours later by gas chromatography:
n-butyl acrylate <20 ppm
ethylhexyl acrylate <30 ppm
methyl methacrylate <50 ppm

We claim:

1. A process for the preparation of a polymer from olefinically unsaturated monomers in an aqueous medium which comprises carrying out the polymerization reaction in the presence of a free radical redox initiator system which is soluble in the aqueous medium and consists of an oxidizing agent, a reducing agent and a synergistic combination of iron and vanadium salts.

2. A process as claimed in claim 1, wherein the oxidizing agent used is an acyl peroxide or a hydroperoxide.

3. A process as claimed in claim 1, wherein the reducing agent used is a sulfinic acid, the alkali metal salt of a sulfinic acid or ascorbic acid.

4. A process as claimed in claim 1, wherein the iron salt used is $FeSO_4$ and the vanadium salt used is $VOSO_4.5H_2O$.

5. A process as claimed in claim 1, wherein the atomic ratio Fe:V is from 100:1 to 1:100.

6. A process as claimed in claim 1, wherein the pH of the polymerization medium is from 1 to 12.

7. A process as claimed in claim 1, wherein the polymerization is carried out as an emulsion polymerization.

8. A process for reducing the content of olefinically unsaturated residual monomers in aqueous polymer mixtures or solutions using a free radical redox initiator system which is soluble in these mixtures or solutions and consists of an oxidizing agent and a reducing agent as well as an iron salt, wherein a corresponding redox initiator system which contains a vanadium salt is used in addition to this iron-containing redox initiator system.

9. A process as claimed in claim 5, wherein the atomic ratio of Fe:V is 1:1.

10. A process as claimed in claim 1, wherein the reducing agent used is (a) the sodium salt of hydroxymethanesulfinic acid or (b) glyoxal.

* * * * *

UNITED STATES PATENT AND TRADEMARK OFFICE
CERTIFICATE OF CORRECTION

PATENT NO. : 5,087,676
DATED : February 11, 1992
INVENTOR(S) : Lothar Heider et al.

It is certified that error appears in the above-identified patent and that said Letters Patent is hereby corrected as shown below:

On the title page:
The Priority Data has been omitted, should be,

--October 12, 1988 [DE] Fed. Rep. of Germany........P3834734.2--.

Signed and Sealed this

Thirty-first Day of August, 1993

Attest:

BRUCE LEHMAN

Attesting Officer     Commissioner of Patents and Trademarks